United States Patent
Hoshiko

[11] Patent Number: 5,979,480
[45] Date of Patent: Nov. 9, 1999

[54] SEMICONDUCTOR PRODUCTION DEVICE, METHOD OF ADJUSTING ITS INTERNAL PRESSURE AND METHOD OF PROCESSING AN OBJECT OF PROCESSING

[75] Inventor: Takahiro Hoshiko, Tokyo, Japan

[73] Assignee: Mitsubishi Denki Kabushiki Kaisha, Tokyo, Japan

[21] Appl. No.: 08/936,741

[22] Filed: Sep. 25, 1997

[30] Foreign Application Priority Data

Apr. 21, 1997 [JP] Japan .................................. 9-103060

[51] Int. Cl.⁶ .................................................. G05D 16/00
[52] U.S. Cl. .............................. 137/14; 137/87.04; 141/8
[58] Field of Search .................... 137/14, 87.04, 137/571; 141/8

[56] References Cited

U.S. PATENT DOCUMENTS 5,277,215  1/1994  Yanagawa et al. ....................... 137/14

FOREIGN PATENT DOCUMENTS 6-177060  6/1994  Japan .

*Primary Examiner*—John Rivell
*Attorney, Agent, or Firm*—Oblon, Spivak, McClelland, Maier & Neustadt, P.C.

[57] ABSTRACT

An object is to obtain a semiconductor production device, a method of adjusting its internal pressure and a method of processing an object of processing which can prevent adhesion of particles to an object of processing. The amount of gas in a cassette chamber (1) is adjusted to bring the internal pressure in the cassette chamber (1) close to atmospheric pressure. Next, on the basis of the pressure difference between atmospheric pressure and the internal pressure gas is gradually moved through gas discharge means (Ta, V13, Tb, Tc) between the atmosphere and the cassette chamber (1) so that the internal pressure becomes equal to the atmospheric pressure. Then a gate (G1) is opened/closed to convey an object of processing between the cassette chamber (1) and the atmosphere. Hence, no flow of gas is caused between the processing chamber and the atmosphere when the gate (G1) is opened/closed, which prevents adhesion of particles to the object of processing.

16 Claims, 13 Drawing Sheets

SEMICONDUCTOR PRODUCTION DEVICE, METHOD OF ADJUSTING ITS INTERNAL PRESSURE AND METHOD OF PROCESSING AN OBJECT OF PROCESSING

BACKGROUND OF THE INVENTION

1. Field of the Invention

The present invention relates to semiconductor production devices, such as CVD devices, sputtering devices, dry etching devices, etc., and relates to a method of adjusting the internal pressure and a method of processing an object of processing.

2. Description of the Background Art

FIG. 22 is a diagram showing a structure of a part of a conventional semiconductor production device. The operation of this semiconductor production device will now be described referring to FIG. 23. When an object of processing, OBJ, e.g., a semiconductor wafer, is conveyed into the atmosphere from a cassette chamber 1, or a part of the processing chamber, the internal pressure in the cassette chamber 1 is adjusted on the basis of the conventional internal pressure adjusting method shown in FIG. 23.

First, referring to step S01, at first (when the time is zero), the internal pressure of the cassette chamber 1 is evacuated by using the vacuum pump Pa with the valve V11 opened to produce a vacuum therein. The valve V12 and the gate G1 are closed.

Next, referring to step S02, the valve V11 is closed to stop the exhaust of the gas in the cassette chamber 1.

Next, referring to step S03, at time t1, the valve V12 is opened to introduce a purge gas into the cassette chamber 1.

Next, referring to step S04, it is determined on the basis of a pressure gauge PG whether the internal pressure is at atmospheric pressure.

Next, referring to step S05, suppose that the pressure gauge PG indicates atmospheric pressure. At this time, the valve V12 is closed to maintain the internal pressure in the cassette chamber 1 constant.

Next, referring to step S06, the gate G1 is opened and the object OBJ is moved from within the cassette chamber 1 into the atmosphere. This time is taken as t3 herein.

However, the conventional method has the following problem The pressure gauge PG generally indicates incorrect pressure deviating from actual pressure as it is used. FIG. 24 shows a change of the internal pressure in the case where the pressure gauge PG indicates pressure lower than actual pressure. In this case, since the pressure gauge PG indicates pressure lower than actual pressure, the pressure P+ indicted by the pressure gauge PG is higher than the actual atmospheric pressure Pt. On the other hand, FIG. 25 shows a change of the internal pressure in the case where the pressure gauge PG indicates pressure higher than actual pressure. In this case, since the pressure gauge PG indicates pressure higher than actual pressure, the pressure P− indicated by the pressure gauge PG is lower than the actual atmospheric pressure Pt. As shown in these diagrams, at time t3, when the gate G1 is opened, a large difference exists between the internal pressure and the atmospheric pressure to cause a rapid flow of gas between the cassette chamber 1 and the atmosphere. This flow of gas will cause particles in the atmosphere to flow into the cassette chamber 1, or will blow up particles in the cassette chamber 1, and then the particles will attach to the surface of the object OBJ. When a large number of particles are attached to the surface of the object OBJ, the following processes and the yield will be adversely affected.

SUMMARY OF THE INVENTION

According to a first aspect of the present invention, a semiconductor production device comprises: a processing chamber having a gate through which an object of processing is conveyed in and out; a pressure gauge for measuring internal pressure in the processing chamber; exhausting means for exhausting the processing chamber to make a vacuum; purge gas introducing means for introducing a purge gas into the processing chamber; a valve; and a check valve having its one end connected to the processing chamber through the valve and its other end maintained at atmospheric pressure, for allowing movement of gas only in one direction between the one end and the other end.

Preferably, according to a second aspect of the present invention, the semiconductor production device further comprises another check valve having its one end connected to the processing chamber through the valve and its other end opened to atmosphere, for allowing movement of gas only in the opposite direction to the direction which the check valve allows.

Preferably, according to a third aspect of the present invention, in the semiconductor production device, the valve is provided in a position branched off from the purge gas introducing means.

Preferably, according to a fourth aspect of the present invention, the semiconductor production device further comprises flow rate measuring means for measuring a flow rate of gas flowing through the check valve.

Preferably, according to a fifth aspect of the present invention, the semiconductor production device further comprises another check valve having its one end connected to the processing chamber through the valve and its other end opened to atmosphere, for allowing movement of gas only in the opposite direction to the direction which the check valve allows, and another flow rate measuring means for measuring a flow rate through the another check valve.

Preferably, according to a sixth aspect of the present invention, the semiconductor production device further comprises flow rate measuring means for measuring a flow rate of gas flowing through the check valve.

Preferably, according to a seventh aspect of the present invention, the semiconductor production device further comprises another check valve having its one end connected to the processing chamber through the valve and its other end opened to atmosphere, for allowing movement of gas only in the opposite direction to the direction which the check valve allows, and another flow rate measuring means for measuring a flow rate through the another check valve.

Preferably, according to a eighth aspect of the present invention, in the semiconductor production device, the check valve allows movement of gas only in the direction from the other end to the one end, and the semiconductor production device further comprises a bag connected to the other end, provided in the atmosphere with a certain gas contained therein, and capable of deformation such that pressure of the certain gas and atmospheric pressure become equal.

According to a ninth aspect of the present invention, in a method of adjusting internal pressure in a semiconductor production device which comprises a processing chamber into and out of which an object of processing is conveyed, a pressure gauge for measuring internal pressure of the processing chamber, a valve having its one end connected to the processing chamber, and a check valve having its one end connected to the other end of the valve and its other end maintained at atmospheric pressure, for allowing movement of gas only in one direction between the one end and the other end, the internal pressure adjusting method comprises a first step of introducing a purge gas into the processing chamber evacuated to a vacuum with the valve closed until the pressure gauge detects that the internal pressure of the processing chamber is at atmospheric pressure, a second step of opening the valve to move gas on the basis of a pressure difference between the two ends of the check valve, and a third step of detecting stabilization of the internal pressure.

According to a tenth aspect of the present invention, in the method of adjusting internal pressure in the semiconductor production device, the semiconductor production device further comprises exhausting means for exhausting the processing chamber to a vacuum and purge gas introducing means for introducing the purge gas into the processing chamber.

According to a eleventh aspect of the present invention, in the semiconductor production device, the valve is provided in a position branched off from the purge gas introducing means.

According to a twelfth aspect of the present invention, in a method of adjusting internal pressure in a semiconductor production device which comprises a processing chamber into and out of which an object of processing is conveyed, purge gas supply means for supplying a purge gas, a first valve having its one end connected to the processing chamber and its other end connected to the purge gas supply means, a second valve having its one end connected to the other end of the first valve and its other end, and a check valve having its one end connected to the other end of the second valve and its other end maintained at atmospheric pressure, for permitting movement of gas only in one direction between the one end and the other end, the internal pressure adjusting method comprises a first step of, with the processing chamber evacuated to make a vacuum with the first valve closed, opening the first valve to introduce the purge gas into the processing chamber, a second step of opening the second valve, and a third step of conveying the object of processing in and out after the internal pressure of the processing chamber is stabilized.

According to a thirteenth aspect of the present invention, in the method of adjusting internal pressure in the semiconductor production device, the first and second steps are conducted at the same time, and in the third step, before conveying the object of processing in and out after the internal pressure of the processing chamber is stabilized, the first and second valves are closed in this order.

Preferably, according to a fourteenth aspect of the present invention, in the method of adjusting internal pressure of the semiconductor production device, the semiconductor production device further comprises flow rate measuring means for measuring a flow rate of gas flowing through the check valve, and in the third step, stabilization of the internal pressure is detected as the flow rate measuring means detects absence of gas flowing through the check valve.

Preferably, according to a fifteenth aspect of the present invention, in the method of adjusting internal pressure in the semiconductor production device, the semiconductor production device further comprises a pressure gauge for measuring internal pressure of the processing chamber, and the internal pressure adjusting method further comprises a fourth step conducted when the operation moves from the first step to the second step, for confirming that the internal pressure is at atmospheric pressure by using the pressure gauge.

According to a sixteenth aspect of the present invention, a method of processing an object of processing uses a semiconductor production device which comprises: a processing chamber having a gate through which the object of processing is conveyed in and out; a pressure gauge for measuring internal pressure in the processing chamber; exhausting means for exhausting the processing chamber to make a vacuum; purge gas introducing means for introducing a purge gas into the processing chamber; a valve; and a check valve having its one end connected to the processing chamber through the valve and its other end maintained at atmospheric pressure, for allowing movement of gas only in one direction between the one end and the other end, and the method comprises: a first step of introducing the purge gas into the processing chamber evacuated to a vacuum with the valve closed, until the pressure gauge detects that the internal pressure of the processing chamber is at atmospheric pressure; a second step of opening the valve to move gas on the basis of a pressure difference between the two ends of the check valve; and a third step of detecting stabilization of the internal pressure.

According to the first aspect of the present invention, when the processing chamber is evacuated by the exhausting means and then its internal pressure is brought back to atmospheric pressure by using a purge gas, the internal pressure measured by the pressure gauge as being atmospheric pressure may actually differ from the atmospheric pressure. However, the valve is opened and then the check valve causes gas to gradually move to bring the internal pressure to atmospheric pressure. Accordingly, no dust particles are suspended when the gate is opened thereafter and therefore no particles attach to the object of processing. For example, when the pressure gauge indicates pressure somewhat lower than actual internal pressure, the pressure gauge does not indicate atmospheric pressure as the internal pressure until the purge gas is introduced to a pressure actually higher than the atmospheric pressure. When the check valve permits movement of gas only in the direction from its one end to the other end, however, the purge gas leaks out through the check valve and the internal pressure moves to the atmospheric pressure. On the other hand, when the pressure gauge indicates pressure somewhat higher than actual internal pressure, the pressure gauge indicates as if the internal pressure was at atmospheric pressure even though the purge gas has been actually introduced only to such a degree that the internal pressure is lower than the atmospheric pressure. When the check valve permits movement of gas only in the direction from its other end to the one end, gas held at atmospheric pressure leaks in from the check valve and the internal pressure moves to the atmospheric pressure. Needless to say, in the latter case, the valve is closed when the processing chamber is exhausted.

According to the third aspect of the present invention, unlike the case in which the valve is connected to the processing chamber, the pressure of the purge gas is not directly exerted onto the processing chamber, but the purge gas is introduced into the processing chamber at pressure close to atmospheric pressure by the effect of the check valve provided through the valve. Furthermore, since it is possible to reduce the number of piping connected to the processing chamber, dust particles will stay in a smaller area on the inner wall of the processing chamber. This further suppresses occurrence of dust.

According to the fourth aspect of the present invention, it is possible to more accurately confirm that the internal pressure coincides with atmospheric pressure by confirming absence of flow of gas through the check valve by using the flow rate measuring means.

According to the eighth aspect of the present invention, when the internal pressure in the processing chamber is not increased to atmospheric pressure with the purge gas, the internal pressure of the processing chamber can be increased to atmospheric pressure by using a certain gas through the check valve. Furthermore, because an arbitrary gas can be used as the certain gas, it is more advantageous than the case in which gas containing moisture such as air is introduced.

According to the ninth aspect of the present invention, the purge gas is introduced with the valve closed and then the pressure difference between the internal pressure and atmospheric pressure is eliminated through the check valve. Accordingly, even if the pressure gauge has error, the inside of the processing chamber can be brought back to the atmospheric pressure with minimum mixture of air. Furthermore, this prevents rapid change of the pressure, and hence dust.

According to the twelfth aspect of the present invention, even if the pressure of the purge gas is not equal to atmospheric pressure, the second valve adjusts the pressure of gas flowing through the first valve to atmospheric pressure, which prevents rapid change of the pressure, and hence dust.

According to the fourteenth aspect of the present invention, it is possible to accurately detect stabilization of the internal pressure of the processing chamber.

According to the sixteenth aspect of the present invention, it is possible to suppress adhesion of dust particles to the object of processing and therefore the yield of the object of processing and the like can be improved.

The present invention has been made to solve the conventional problem, and it is an object of the invention to provide a semiconductor production device, a method of adjusting its internal pressure and a method of processing an object of processing, which prevent flow of gas between a processing chamber and atmosphere to prevent adhesion of particles to the object of processing.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
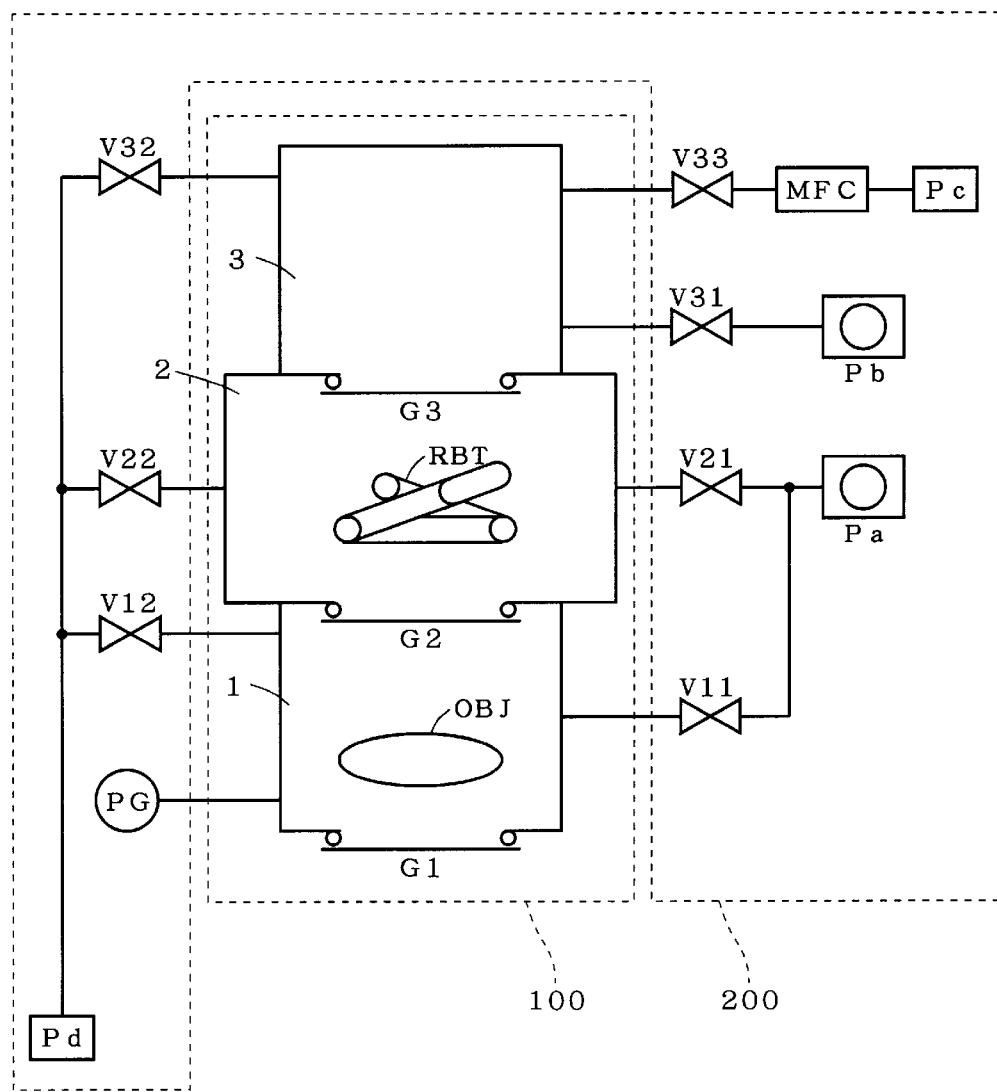
FIG. 1 is a diagram roughly showing an example of structure of a semiconductor production device of the present invention.

FIG. 1 is a diagram roughly showing an example of a structure of the semiconductor production device of the present invention. This semiconductor production device is a CVD device, a sputtering device, a dry-etching device, or the like. This semiconductor production device includes a processing chamber 100 having gates G1–G3 through which an object of processing, OBJ, such as a semiconductor wafer, is conveyed in and out and a gas introducing/exhausting device 200 for introducing or exhausting gas into or out of the processing chamber 100. According to a method of producing semiconductor devices of the embodiment of the invention, the object OBJ is processed by using the semiconductor production device of the invention in a process of producing semiconductor devices to manufacture semiconductor devices such as semiconductor integrated circuits on the object OBJ.

The processing chamber 100 includes a cassette chamber 1 for temporarily storing the object of processing, a main processing chamber 3 for applying processing such as sputtering, etching, etc. to the object OBJ such as a semiconductor wafer, a robot chamber 2 interposed between the cassette chamber 1 and the main processing chamber 3 and having a robot RBT for conveying the object OBJ between the chambers, a gate G1 opened and closed between the atmosphere and the cassette chamber 1, a gate G2 opened and closed between the cassette chamber 1 and the robot chamber 2, and a gate G3 opened and closed between the robot chamber 2 and the main processing chamber 3.

The gas introducing/exhausting device 200 has a purge gas source Pd serving as a source of purge gas containing $N_2$, valves V12, V22 and V32 opened/closed to introduce the purge gas respectively into the chambers 1, 2, and 3, a process gas source Pc serving as a source of process gas, a valve V33 opened/closed to introduce the process gas into the chamber 3, a control device MFC for controlling the amount of the process gas, a vacuum pump Pb for exhausting gas in the chamber 3, a valve V31 opened/closed to stop the exhaust of gas in the chamber 3, a vacuum pump Pa for exhausting gas in the chambers 1 and 2, a valve V11 opened/closed to stop the exhaust of gas in the chamber 1, a valve V21 opened/closed to stop the exhaust of gas in the chamber 2, and a pressure gauge PG for measuring the internal pressure in the chamber 1. The purge gas source Pd and the valves V12, V22 and V32 form purge gas introducing means for introducing the purge gas into the processing chamber 100. The vacuum pumps Pa, Pb, the valves V11, V21 and V31 form exhausting means for exhausting the processing chamber 100 to make a vacuum.

Next, the operation of the semiconductor production device of FIG. 1 will be explained. The object OBJ in the atmosphere is conveyed into the main processing chamber 3 through the gate G1, the cassette chamber 1, the gate G2, the robot chamber 2, and the gate G3, and it is subjected to certain processing in the main processing chamber 3. After processed in the main processing chamber 3, the object OBJ is conveyed into the atmosphere from the main processing chamber 3 through the reverse route.

Figure 2:
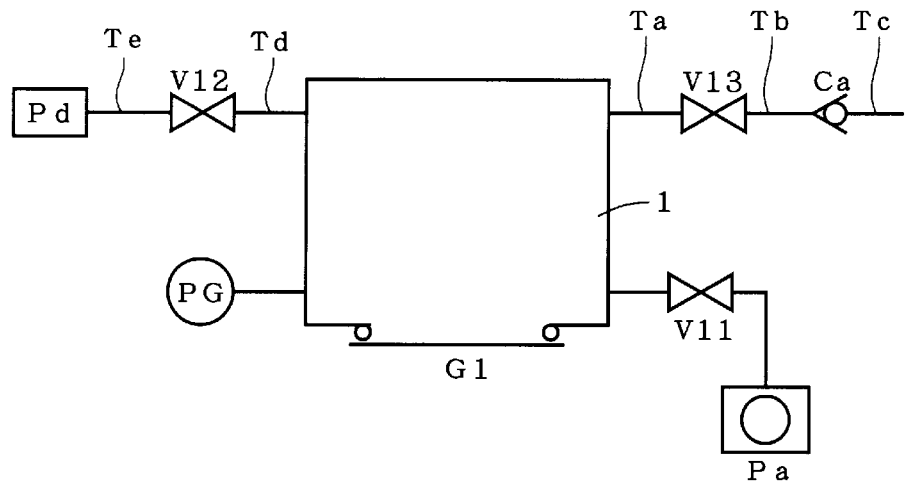
FIG. 2 is a diagram showing a structure of a part of the semiconductor production device in a first preferred embodiment of the present invention.

FIG. 2 shows a structure of the part related to the cassette chamber 1 in the first preferred embodiment of the invention. The cassette chamber 1 is connected to the purge gas supply source Pd through the piping Td, the valve V12 and the piping Te. In addition to the components mentioned referring to FIG. 1, the semiconductor production device of the invention further includes a valve V13, and a check valve Ca having its one end connected to the side of the cassette chamber 1 through the valve V13 and its other end kept at atmospheric pressure, for permitting movement of gas only in one direction from the one end to the other end on the basis of a pressure difference between the internal pressure in the cassette chamber 1 and atmospheric pressure.

The piping Ta, the valve V13, the piping Tb, the check valve Ca and the piping Tc connected in series in this order from the cassette chamber 1 to the atmosphere form first gas discharge means. The piping Tc is opened to the atmosphere. The diameter of the piping Ta, Tb and Tc is set sufficiently smaller than that of the gate G1, e.g., to ¼ inch or smaller. Other characters in FIG. 2 correspond to those in FIG. 1.

Figure 3:
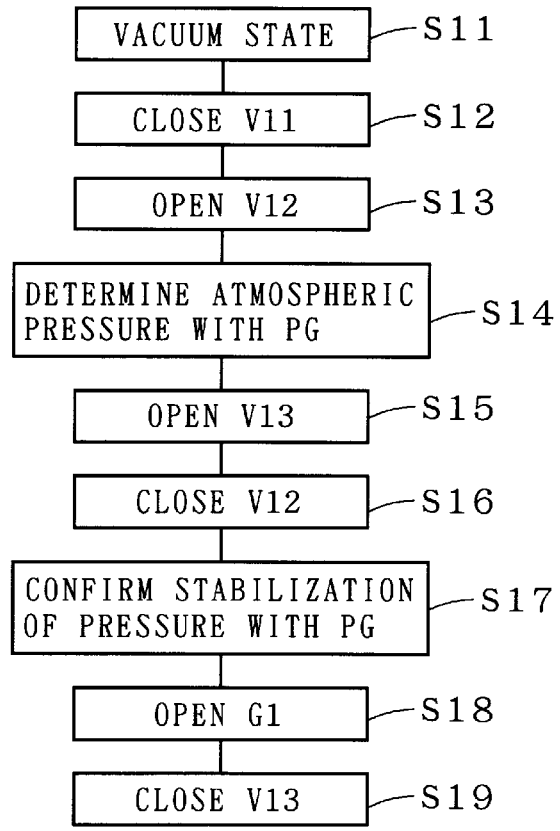
FIG. 3 is a flowchart showing a method of adjusting the internal pressure in first and second preferred embodiments of the present invention.

Next, the operation of the part related to the cassette chamber 1 in this preferred embodiment will now be described in detail referring to FIG. 2 to FIG. 4. When the object OBJ is conveyed from within the cassette chamber 1 into the atmosphere, the internal pressure in the cassette chamber 1 is adjusted on the basis of the internal pressure adjusting method shown in FIG. 3. Here, it is assumed that the pressure gauge PG indicates pressure lower than actual pressure.

Figure 4:
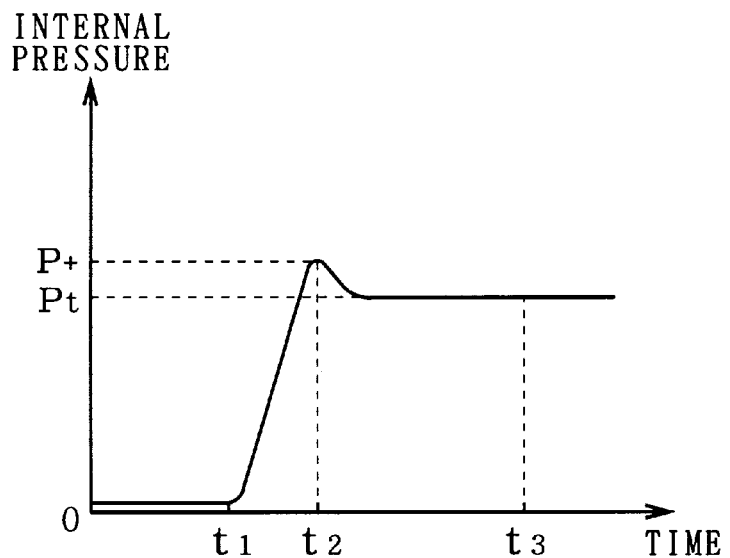
FIG. 4 is a graph showing an example of change of the internal pressure in the invention.

The valve V11 is opened after the object OBJ is conveyed from the robot chamber 2 into the cassette chamber 1 to evacuate the internal pressure in the cassette chamber 1 to a vacuum (step S11, time 0 in FIG. 4). The valves V12, V13 and the gate G1 are closed to shut off the cassette chamber 1 from the atmosphere.

Next, referring to step S12, the valve V11 is closed to stop exhausting the gas in the cassette chamber 1.

Next, referring to step S13, at time t1, the valve V12 is opened to introduce a purge gas into the cassette chamber 1.

Next, referring to step S14, it is determined whether the internal pressure is at atmospheric pressure on the basis of the pressure gauge PG. This way, in steps S12–S14, with the cassette chamber 1 evacuated to a vacuum with the valve V13 closed, the purge gas is introduced into the cassette chamber 1 until the pressure gauge PG detects that the internal pressure in the cassette chamber 1 achieves atmospheric pressure.

Next, referring to step S15, it is assumed that the pressure gauge PG indicates the atmospheric pressure at time t2. Since the pressure gauge PG indicates pressure lower than the actual pressure, the internal pressure P+ in the cassette chamber 1 is higher than the atmospheric pressure Pt at time t2, even through the pressure gauge PG is indicating the atmospheric pressure. At time t2, the valve V13 is opened. Since the internal pressure in the cassette chamber 1 is higher than the atmospheric pressure Pt, the first gas discharge means allows the purge gas to flow from within the cassette chamber 1 into the atmosphere on the basis of the difference in pressure between the two ends of the check valve Ca.

Next, referring to step S16, the valve V12 is closed to stop the introduction of the purge gas. As the purge gas flows through the first gas discharge means into the atmosphere from the cassette chamber 1, the internal pressure gradually decreases and the pressure indicated by the pressure gauge PG changes, too. Thus, in steps S15 and S16, the internal pressure in the cassette chamber 1 moves to the atmospheric pressure. Since the piping included in the first gas discharge means is thin, the purge gas gradually flows from the cassette chamber 1 to the atmosphere, which prevents particles of dust from being suspended in the cassette chamber 1.

Next, referring to step S17, the condition after step S16 is maintained for a certain time period until it is detected that the pressure indicated by the pressure gauge PG becomes stabilized. It is assumed here that the pressure indicated by the pressure gauge PG is stabilized at time t3. At this time, the atmospheric pressure Pt and the internal pressure are equal.

Next, referring to step S18, the gate G1 is opened to move the object OBJ from the cassette chamber 1 into the atmosphere. When the gate G1 is opened, no particles of dust are blown up because the internal pressure and the atmospheric pressure Pt are equal. Next, referring to step S19, the valve V13 is closed.

When moving the object OBJ from the atmosphere into the cassette chamber 1, the processes in steps S12–S19 are conducted as well.

Figure 5:
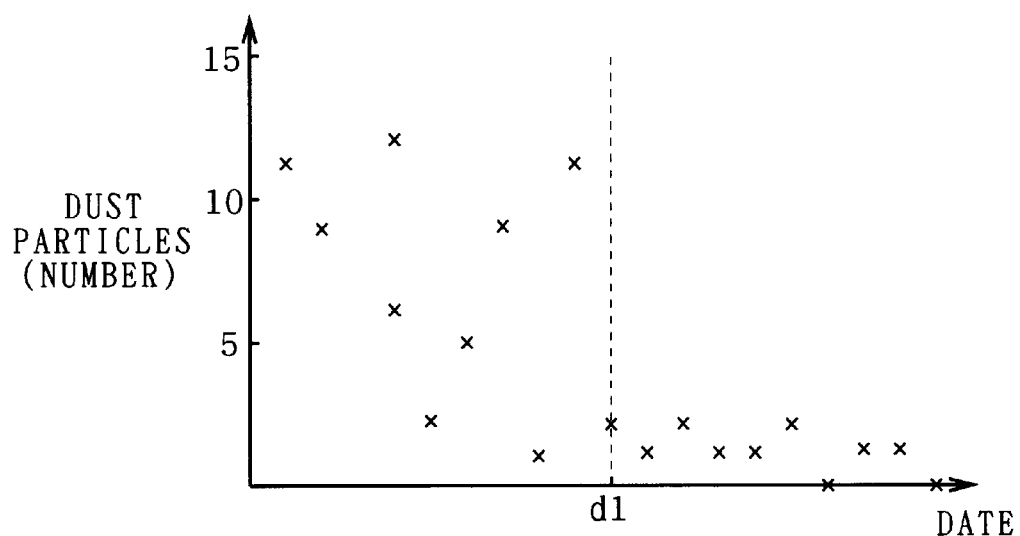
FIG. 5 is a graph showing the number of dust particles when the present invention is applied.

FIG. 5 is a graph showing the number of dust particles with date. The object OBJ was an 8-inch semiconductor wafer. In FIG. 5, the vertical axis indicates the number of particles (the number of dust particles) of 0.2 pm or larger attached on the surface of the processed object OBJ. On the horizontal axis, the conventional internal pressure adjusting method was applied before d1 and the internal pressure adjusting method of the invention was applied after d1. As shown in FIG. 5, after d1, as compared with before d1, a smaller number of particles were attached onto the surface of the processed object OBJ.

This preferred embodiment provides the following effect. That is to say, even if the pressure gauge PG indicates pressure lower than actual pressure, the first gas discharge means prevents dust particles from adhering to the processed abject OBJ when the gate G1 is opened.

Second Preferred Embodiment

Figure 6:
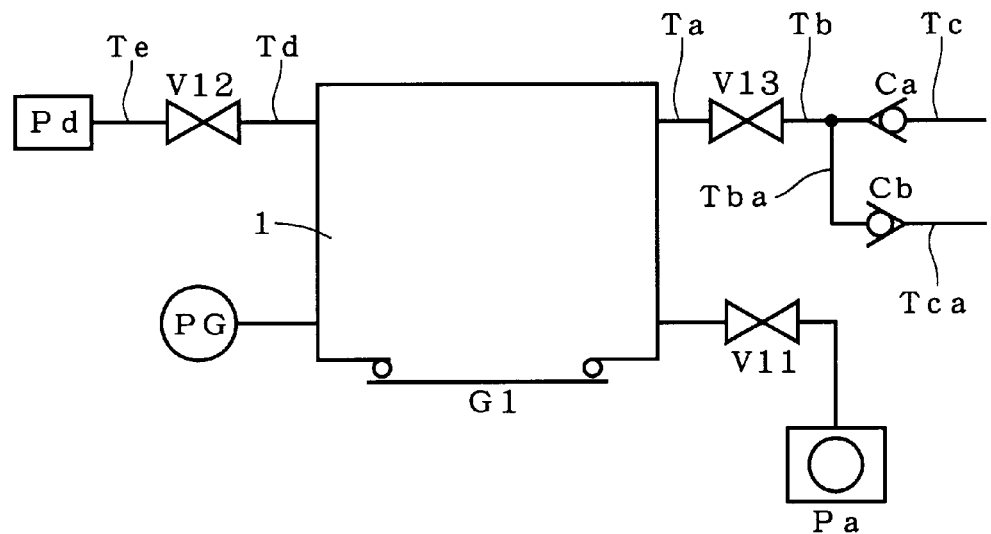
FIG. 6 is a diagram showing a structure of a part of a semiconductor production device in the second preferred embodiment of the present invention.

FIG. 6 is a diagram showing a structure of the part related to the cassette chamber 1 in a second preferred embodiment of the present invention. The semiconductor production device of this preferred embodiment further includes, in addition to the components of the semiconductor production device of the first preferred embodiment, piping Tba, a check valve Cb and piping Tca. The check valve Cb has its one end connected to the side of the cassette chamber 1 through the valve V13 and its other end maintained at atmospheric pressure, which permits gas to move only in the one direction from the other end to the one end on the basis of a pressure difference between the internal pressure of the cassette chamber 1 and atmospheric pressure. The piping Tb branches in the middle and is connected to the atmosphere through the series connection of the piping Tba, the check valve Cb and the piping Tca. Other characters in FIG. 6 correspond to those in FIG. 2. The piping Ta, the valve V13, the piping Tb and Tba, the check valve Cb and the piping Tca form second gas discharge means. The piping Tba, Tca has a diameter as small as ¼ inch, for example.

Figure 7:
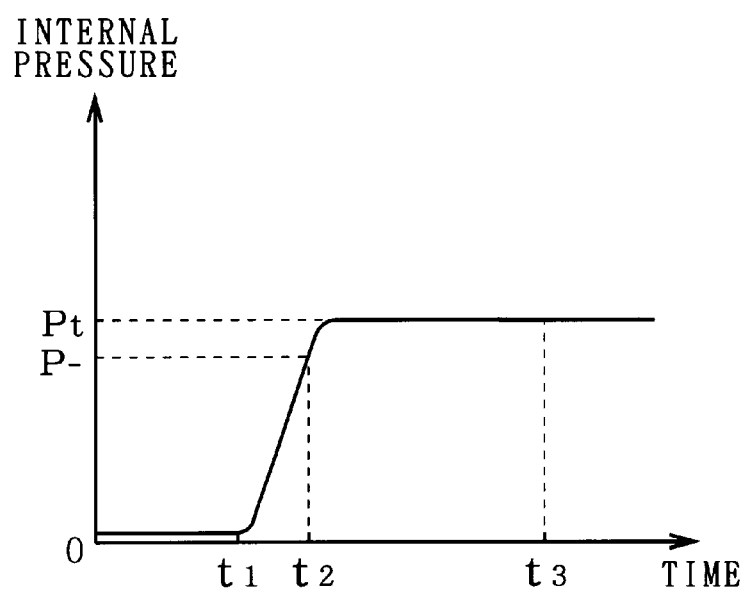
FIG. 7 is a graph showing an example of change of the internal pressure in the invention.

In addition to the operation in the first preferred embodiment, the part related to the cassette chamber 1 in this preferred embodiment conducts the following operation. It is herein assumed that the pressure gauge PG indicates pressure higher than actual pressure. First, processings in steps S11–S14 shown in FIG. 3 are performed. Steps S11–S14 are the same as those described in the first preferred embodiment. FIG. 7 is a graph showing an example of change of the internal pressure in the invention, where the characters correspond to those in FIG. 4.

Next, referring to step S15, since the pressure gauge PG indicates pressure higher than actual pressure, the internal pressure P− in the cassette chamber 1 is lower than the atmospheric pressure Pt, even if the pressure gauge PG is indicating atmospheric pressure at time t2 in FIG. 7. At time t2, the valve V13 is opened. Since the internal pressure in the cassette chamber 1 is lower than the atmospheric pressure Pt, the second gas discharge means allows air to flow from the atmosphere to the cassette chamber 1 on the basis of the pressure difference between the two ends of the check valve Cb.

Next, referring to step S16, the valve V12 is closed to stop introducing the purge gas. Since the air is flowing through the second gas discharge means into the cassette chamber 1 from the atmosphere, the internal pressure gradually increases, with which the pressure indicated by the pressure gauge PG also changes. Thus, in steps S15 and S16, the internal pressure in the cassette chamber 1 changes to the atmospheric pressure. Since the piping included in the second gas discharge means is thin, the air gradually flows from the atmosphere into the cassette chamber 1, causing less particles of dust to be suspended in the cassette chamber 1.

Next, the processings in steps S17–S19 are performed. The steps S17–S19 are the same as those described in the first preferred embodiment.

In addition to the effect of the first preferred embodiment, this preferred embodiment provides the following effect. That is to say, even if the pressure gauge PG indicates pressure higher than actual pressure, the presence of the second gas discharge means prevents dust particles from being attached to the object OBJ when the gate G1 is opened.

Third Preferred Embodiment

Figure 8:
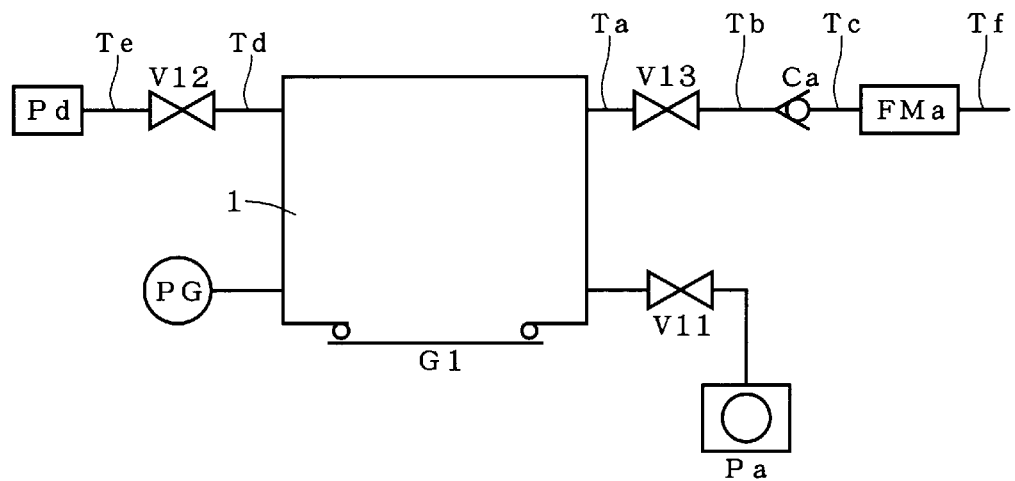
FIG. 8 is a diagram showing a structure of a part of a semiconductor production device in a third preferred embodiment of the present invention.

FIG. 8 is a diagram showing a structure of the part related to the cassette chamber 1 in a third preferred embodiment of the present invention. In addition to the components of the semiconductor production device of the first preferred embodiment, the semiconductor production device of this preferred embodiment further has a flow rate measuring device (flow rate measuring means) FMa called a flow meter (FM) connected to one end of the piping Tc, for measuring the flow rate of the gas flowing through the check valve Ca, and piping Tf connected to it. The piping Tf is opened to atmosphere. Other characters in FIG. 8 correspond to those in FIG. 2. The piping Ta, the valve V13, the piping Tb, the check valve Ca, the piping Tc, the flow rate measuring device FMa and the piping Tf form third gas discharge means.

Figure 9:
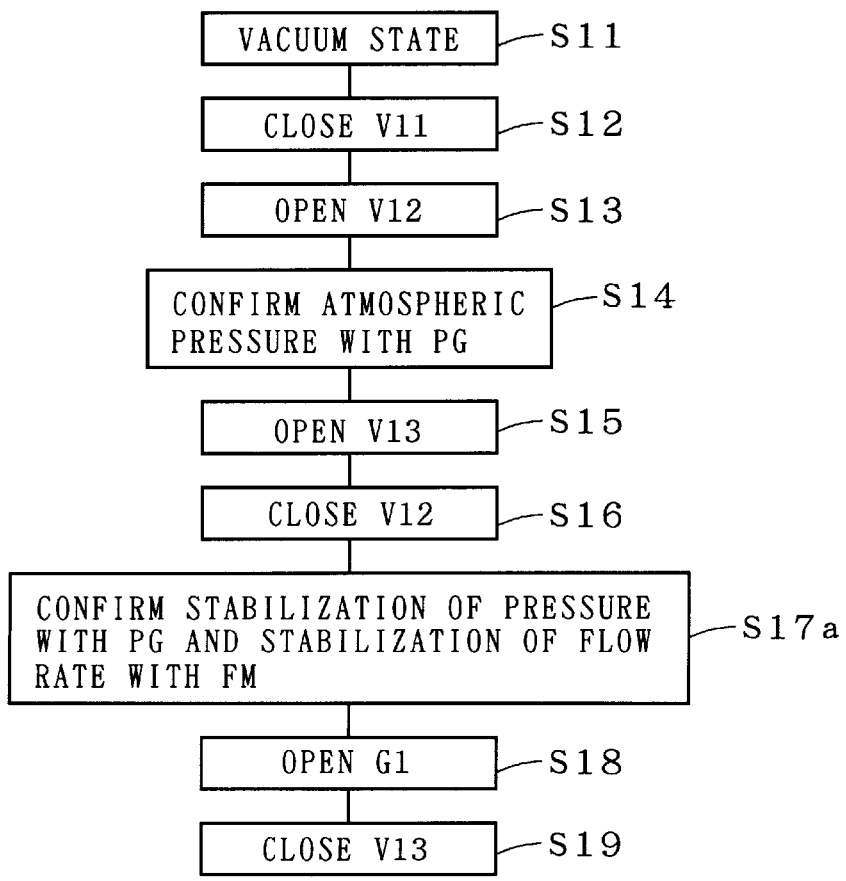
FIG. 9 is a flowchart showing a method of adjusting the internal pressure in third and fourth preferred embodiments of the present invention.

In addition to the operation in the first preferred embodiment, the part related to the cassette chamber 1 in this preferred embodiment conducts the following operation. FIG. 9 is a flow chart showing the internal pressure adjusting method in the third preferred embodiment of the invention. In step S17a of this preferred embodiment, the condition after step S16 is maintained for a certain time until it is detected that the pressure indicated by the pressure gauge PG is stabilized and the flow rate measuring device FMa detects that no gas is flowing through the check valve Ca. When the pressure indicated by the pressure gauge PG is stabilized and the flow rate measuring device FMa detects absence of gas flowing through the check valve Ca, it means that the internal pressure in the cassette chamber 1 has become equal to the atmospheric pressure Pt, which corresponds to time t3 in FIG. 4. Other characters in FIG. 9 correspond to those in FIG. 3.

In addition to the effect of the first preferred embodiment, this preferred embodiment provides the following effect. That is to say, in addition to confirming stabilization of the pressure by using the pressure gauge PG, it can be correctly confirmed that the atmospheric pressure and the internal pressure are equal by using the flow rate measuring device FMa.

Fourth Preferred Embodiment

Figure 10:
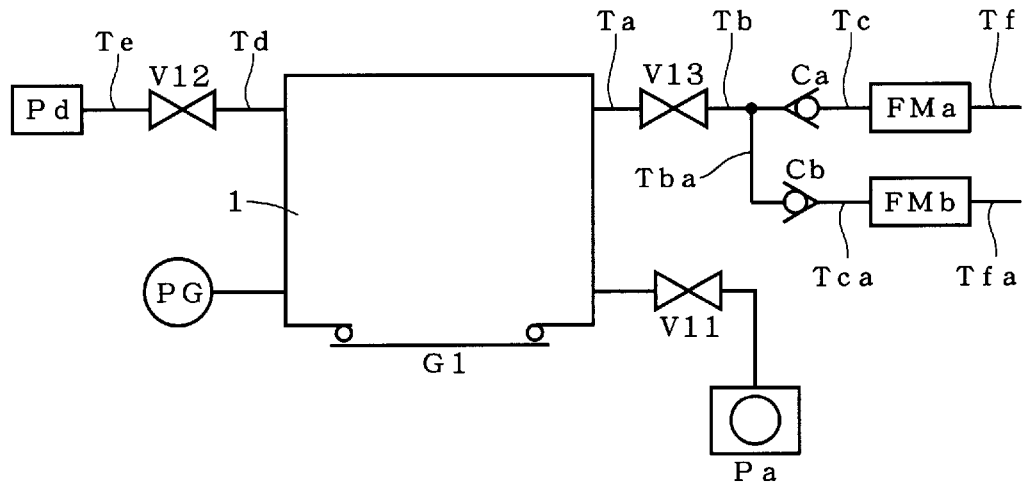
FIG. 10 is a diagram showing a structure of a part of a semiconductor production device in the fourth preferred embodiment of the present invention.

FIG. 10 is a diagram showing a structure of the part related to the cassette chamber 1 in a fourth preferred embodiment of the present invention. In addition to the components of the semiconductor production device of the second preferred embodiment, the semiconductor production device of this preferred embodiment further includes flow rate measuring devices FMa, FMb, and piping Tf and Tfa. The piping Tc has its one end connected to the atmosphere through the flow rate measuring device FMa and the piping Tf. One end of the piping Tca is connected to the atmosphere through the flow rate measuring device FMb and the piping Tfa.

Other characters in FIG. 10 correspond to those in FIG. 6. The piping Ta, the valve V13, the piping Tb, the check valve Ca, the piping Tc, the flow rate measuring device FMa and the piping Tf form the third gas discharge means shown in the third preferred embodiment. The piping Ta, the valve V13, the piping Tb, Tba, the check valve Cb, the piping Tca, the flow rate measuring device FMb and the piping Tfa form fourth gas discharge means.

In addition to the operation of the second preferred embodiment, the part related to the cassette chamber 1 in this preferred embodiment conducts the following operation. This operation is the same as the internal pressure adjusting method shown in FIG. 9. In step S17a in this preferred embodiment, the condition after step S16 is maintained for a certain time until the pressure gauge PG indicates a stable pressure and the flow rate measuring devices FMa and FMb detect that no gas is flowing to the check valves Ca and Cb, respectively. When the pressure indicated by the pressure gauge PG is stabilized and the flow rate measuring devices FMa and FMb detect no gas flowing to the check valves Ca and Cb, it means that the internal pressure in the cassette chamber 1 has become equal to the atmospheric pressure Pt, which corresponds to time t3 in FIG. 4 and FIG. 7.

In addition to the effect of the third preferred embodiment, this preferred embodiment provides the following effect. That is to say, in addition to confirming that the pressure has been stabilized by using the pressure gauge PG, it is possible to correctly confirm that the atmospheric pressure and the internal pressure are equal by using the flow rate measuring device FMb.

Fifth Preferred Embodiment

Figure 11:
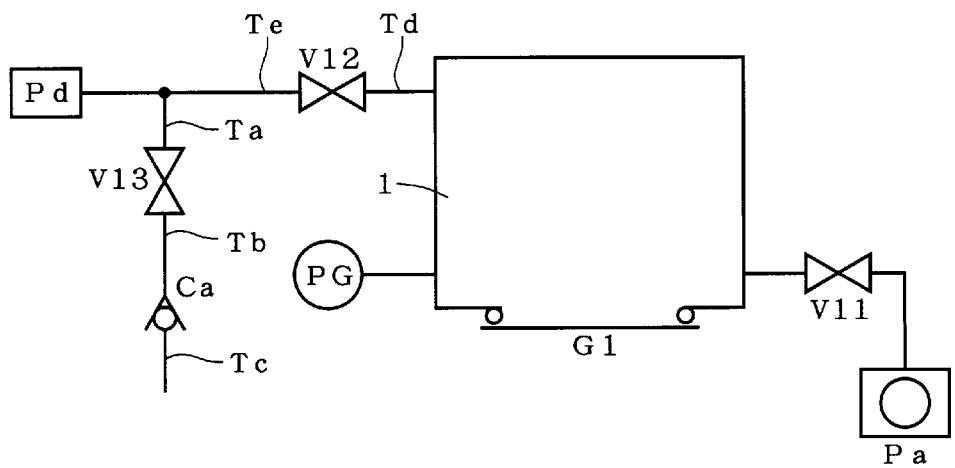
FIG. 11 is a diagram showing a structure of a part of a semiconductor production device in a fifth preferred embodiment of the present invention.

FIG. 11 is a diagram showing a structure of the part related to the cassette chamber 1 in a fifth preferred embodiment of the present invention. In the semiconductor production device of this preferred embodiment, the first gas discharge means in the first preferred embodiment is included in the gas introducing/exhausting device 200 shown in FIG. 1. That is to say, the piping Te branches in the middle and is connected to the atmosphere through the series connection of the piping Ta, the valve V13, the piping Tb, the check valve Ca and the piping Tc. Other characters in FIG. 11 correspond to those in FIG. 2.

Next, the operation of the part related to the cassette chamber 1 in this preferred embodiment will be described in detail referring to FIG. 11 and FIG. 12. When the processed object OBJ is conveyed from the cassette chamber 1 into the atmosphere, the internal pressure in the cassette chamber 1 is adjusted on the basis of the internal pressure adjusting method shown in FIG. 12. Assuming that the purge gas supply source Pd outputs the purge gas at pressure higher than the atmospheric pressure Pt, the pressure of output of the purge gas supply source Pd is taken as P+.

First, referring to step S51, after the object OBJ is conveyed from the robot chamber 2 into the cassette chamber 1, the valve V12 (a first valve), the valve V13 (a second valve), and the gate G1 are closed to shut off the cassette chamber 1 from the atmosphere, and then the valve V11 is opened to produce a vacuum in the cassette chamber 1.

Next, referring to step S52, the valve V11 is closed to stop the exhaust of gas from the cassette chamber 1.

Next, referring to step S53, the valve V12 and the valve V13 are opened. Since the internal pressure in the cassette chamber 1 is lower than atmospheric pressure, the purge gas is more likely to flow to the valve V12 than to the valve V13, so it is introduced into the cassette chamber 1. Thus, the pressure of the purge gas is not directly exerted onto the cassette chamber 1, but the purge gas is introduced into the cassette chamber 1 with pressure close to the atmospheric pressure by the effect of the check valve Ca. Although the purge gas supply source Pd outputs the purge gas at pressure higher than the atmospheric pressure Pt, the internal pressure in the cassette chamber 1 does not exceed the atmospheric pressure Pt. This is due to the fact that when the internal pressure attempts to increase over the atmospheric pressure, the purge gas flows into the atmosphere from the piping Tc through the first gas discharge means. Thus, in steps S52 and S53, with the cassette chamber 1 evacuated to a vacuum with the valve V12 closed, the valve V12 is opened to introduce the purge gas into the cassette chamber 1 and the valve V13 is opened. The purge gas gradually flows into the cassette chamber 1, preventing dust particles from being suspended in the cassette chamber 1.

Referring to step S54, at the time when the pressure indicated by the pressure gauge PG is stabilized, the atmospheric pressure Pt and the internal pressure are equal. Accordingly, if only the pressure indicated by the pressure gauge PG is stabilized, it is not necessary for the pressure gauge PG to indicate the actual pressure.

Next, referring to step S55, the valve V12 is closed. Next, referring to step S56, the valve V13 is closed. Next, referring to step S57, the gate G1 is opened to move the processed object OBJ from the cassette chamber 1 into the atmosphere. When the gate G1 is opened, dust is prevented since the internal pressure and the atmospheric pressure are equal.

Similarly, when moving the object OBJ from the atmosphere to the cassette chamber 1, the processings in steps S52–S57 are conducted. Thus, in steps S54–S57, the object OBJ is conveyed in and out after the internal pressure in the cassette chamber 1 has got stabilized.

This preferred embodiment provides the following effect. That is to say, since the first gas discharge means is included in the gas introducing/exhausting device 200, dust particles are prevented from attaching to the processed object OBJ when the gate G1 is opened, even if the pressure gauge PG is not indicating actual pressure.

Sixth Preferred Embodiment

Figure 13:
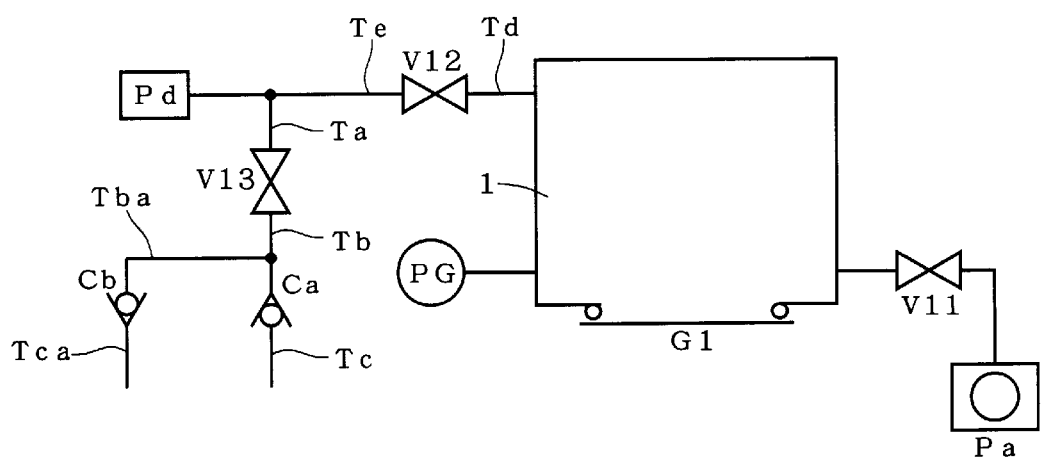
FIG. 13 is a diagram showing a structure of a part of a semiconductor production device in the sixth preferred embodiment of the present invention.

FIG. 13 is a diagram showing a structure of the part related to the cassette chamber 1 in a sixth preferred embodiment of the present invention. In the semiconductor production device of this preferred embodiment, the second gas discharge means in the second preferred embodiment is included in the gas introducing/exhausting device 200 shown in FIG. 1. That it to say, the piping Te branches in the middle and is connected to the atmosphere through the series connection of the piping Ta, the valve V13, the piping Tb, the check valve Ca, and the piping Tc. The piping Tb branches in the middle and is connected to the atmosphere through the series connection of the piping Tba, the check valve Cb and the piping Tca. Other characters in FIG. 13 correspond to those in FIG. 6.

Next, in addition to the operation in the fifth preferred embodiment, the part related to the cassette chamber 1 in this preferred embodiment conducts the following operation. Suppose here that the purge gas supply source Pd outputs the purge gas at a pressure P– lower than the atmospheric pressure Pt.

Figure 12:
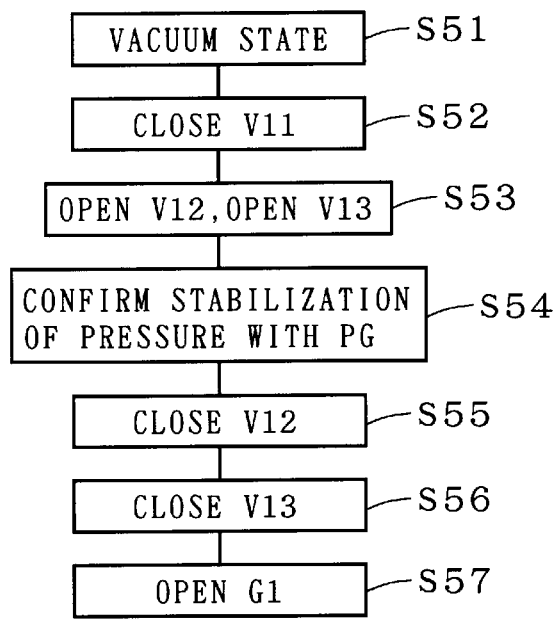
FIG. 12 is a flowchart showing a method of adjusting the internal pressure in fifth and sixth preferred embodiments of the present invention.

First, the processings in steps S51 and S52 shown in FIG. 12 are conducted. These steps are the same as those described in the fifth preferred embodiment.

Next, referring to step S53, the valve V12 and the valve V13 are opened. The purge gas is introduced into the cassette chamber 1 through the valve 12 and the gas in the atmosphere is also introduced through the piping Ta, Tb, Tba, Tca, and the valve V13. Thus, in steps S52 and S53, with the cassette chamber 1 evacuated to a vacuum with the valve V12 closed, the valve V12 is opened to introduce the purge gas into the cassette chamber 1 and the valve V13 is opened. The purge gas gradually flows into the cassette chamber 1, which suppresses dust in the cassette chamber 1.

Next, referring to step S54, this condition is maintained for a certain time until the pressure indicated by the pressure gauge PG is stabilized. When the pressure indicated by the pressure gauge PG is stabilized, the atmospheric pressure Pt and the internal pressure are equal. Accordingly, it is sufficient if the pressure gauge PG is indicating a stable pressure, and it is not necessary that the pressure gauge PG indicates actual pressure.

Next, the processings in steps S55–S57 are conducted. These steps are the same as those described in the fifth preferred embodiment.

In addition to the effect of the fifth preferred embodiment, this preferred embodiment provides the following effect. That is to say, as the second gas discharge means is included in the gas introducing/exhausting device 200, air is introduced to cause the internal pressure to be at atmospheric pressure even if the pressure of the purge gas supply source Pd is lower than the atmospheric pressure, and then dust particles are prevented from adhering to the processed object OBJ when the gate G1 is opened.

Seventh Preferred Embodiment

Figure 14:
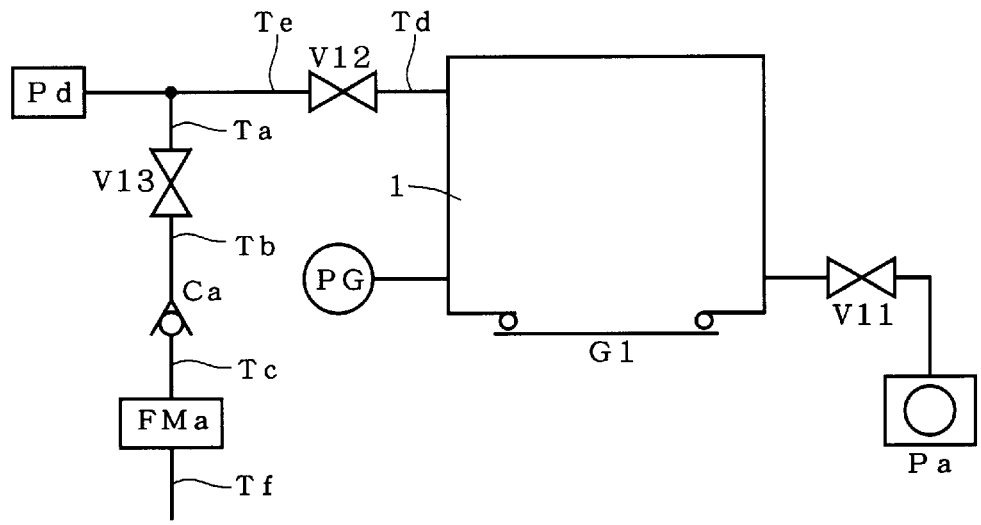
FIG. 14 is a diagram showing a structure of a part of a semiconductor production device in a seventh preferred embodiment of the present invention.

FIG. 14 is a diagram showing a structure of the part related to the cassette chamber 1 in a seventh preferred embodiment of the present invention. In the semiconductor production device of this preferred embodiment, the third gas discharge means in the third preferred embodiment is included in the gas introducing/exhausting device 200 shown in FIG. 1. That is to say, the piping Te branches in the middle and is connected to the atmosphere through the series connection of the piping Ta, the valve V13, the piping Tb, the check valve Ca, the piping Tc, the flow rate measuring device FMa, and the piping Tf. Other characters in FIG. 14 correspond to those in FIG. 8.

Figure 15:
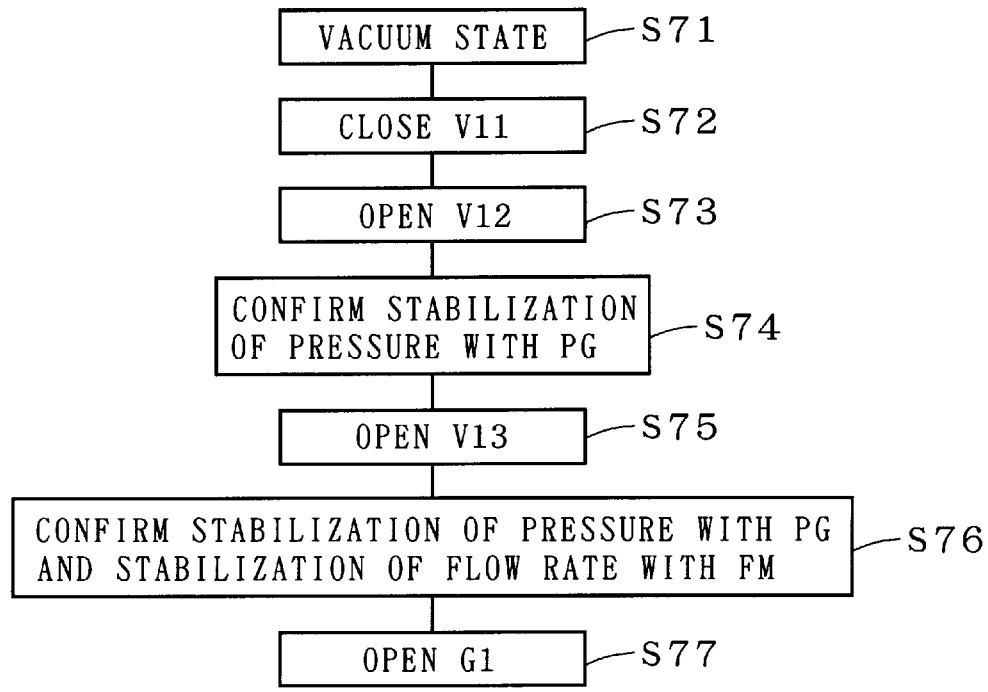
FIG. 15 is a flowchart showing a method of adjusting the internal pressure in seventh and eighth preferred embodiments of the present invention.

Next, the operation of the part related to the cassette chamber 1 in this preferred embodiment will now be described in detail referring to FIG. 14 and FIG. 15. When the processed object OBJ is conveyed from the cassette chamber 1 into the atmosphere, the internal pressure in the cassette chamber 1 is adjusted on the basis of the internal pressure adjusting method shown in FIG. 15. Assuming that the purge gas supply source Pd outputs the purge gas at pressure higher than the atmospheric pressure Pt, the pressure of output of the purge gas supply source Pd is taken as P+.

First, referring to step S71, after the object OBJ is conveyed from the robot chamber 2 into the cassette chamber 1, the valves V12 and V13 and the gate G1 are closed to shut off the cassette chamber 1 from the atmosphere, and then the valve V11 is opened to draw the internal pressure in the cassette chamber 1 to a vacuum.

Next, referring to step S72, the valve V11 is closed to stop the exhaust of the gas in the cassette chamber 1. Next, referring to step S73, the valve V12 is opened to introduce the purge gas into the cassette chamber 1.

Next, referring to step S74, it is confirmed that the internal pressure indicated by the pressure gauge PG is stable. Here, since the purge gas supply source Pd outputs the purge gas at a pressure P+ higher than the atmospheric pressure Pt, the internal pressure is higher than the atmospheric pressure Pt when the internal pressure is stabilized. Then the valve V13 is opened (step S75). As the internal pressure is higher than the atmospheric pressure Pt, the purge gas in the cassette chamber 1 flows into the atmosphere through the piping Td, the valve V12, the piping Te and the third gas discharge means. The internal pressure gradually decreases, with which the pressure indicated by the pressure gauge PG changes, too. The purge gas gradually flows into the atmosphere, which prevents dust in the cassette chamber 1.

Next, referring to step S76, this condition is maintained for a certain time until the pressure indicated by the pressure gauge PG is stabilized. Furthermore, it is confirmed that the flow rate measuring device FMa is indicating absence of flow of gas through the check valve Ca. When the pressure gauge PG indicates a stable pressure and the flow rate measuring device FMa indicates absence of flow of gas through the check valve Ca, the atmospheric pressure Pt and the internal pressure are equal. Thus, in steps S72–S76, with the cassette chamber 1 evacuated to a vacuum with the valve V12 closed, the valve V12 is opened to introduce the purge gas into the cassette chamber 1 and the valve V13 is opened. In step S76, it is detected that the internal pressure in the cassette chamber 1 is stabilized as the flow rate measuring device FMa detects that no gas is flowing to the check valve Ca.

Next, referring to step S77, the gate G1 is opened to move the object OBJ from the cassette chamber 1 into the atmosphere.

When the object OBJ is moved from the atmosphere into the cassette chamber 1, the processings in steps S72–S77 are performed as well. Thus, in step S77, after the internal pressure in the cassette chamber 1 has been stabilized, the object OBJ is conveyed in and out.

In addition to the effect of the fifth preferred embodiment, this preferred embodiment provides the following effect. That is to say, in addition to confirming that the pressure has been stabilized with the pressure gauge PG, it is correctly confirmed by using the flow rate measuring device FMa that the atmospheric pressure and the internal pressure are equal.

Eighth Preferred Embodiment

Figure 16:
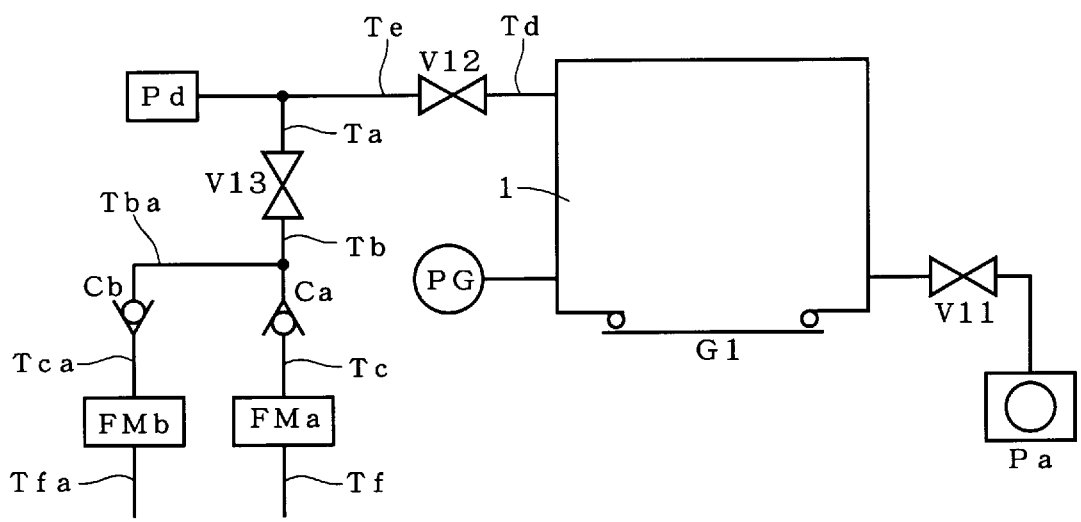
FIG. 16 is a diagram showing a structure of a part of a semiconductor production device in the eighth preferred embodiment of the present invention.

FIG. 16 is a diagram showing a structure of the part related to the cassette chamber 1 in an eighth preferred embodiment of the present invention. In the semiconductor production device of this preferred embodiment, the third and fourth gas discharge means in the fourth preferred embodiment are included in the gas introducing/exhausting device 200 shown in FIG. 1. That is to say, the piping Te branches in the middle and is connected to the atmosphere through the series connection of the piping Ta, the valve V13, the piping Tb, the check valve Ca, the piping Tc, the flow rate measuring device FMa, and the piping Tf. The piping Tb branches in the middle and is connected to the atmosphere through the series connection of the piping Tba, the check valve Cb, the piping Tca, the flow rate measuring device FMb and the piping Tfa. Other characters in FIG. 16 correspond to those in FIG. 10.

In addition to the operation in the seventh preferred embodiment, the part related to the cassette chamber 1 in this preferred embodiment conducts the following operation. In this preferred embodiment, assuming that the purge gas supply source Pd outputs the purge gas at pressure lower than the atmospheric pressure Pt, the pressure of output of the purge gas supply source Pd is taken as P–.

First, operation and conditions in steps S71–S73 are the same as those in the seventh preferred embodiment. This way, in steps S72–S73, the amount of gas in the cassette chamber 1 is adjusted so that the internal pressure in the cassette chamber 1 becomes close to the pressure P– of the purge gas.

Next, referring to step S74, it is confirmed that the internal pressure indicated by the pressure gauge PG is stable. Here, as the purge gas supply source Pd outputs the purge gas at the pressure P– lower than the atmospheric pressure Pt, the internal pressure is lower than the atmospheric pressure Pt when the internal pressure is stabilized. Around this time, the valve V13 is opened (step S75). Since the internal pressure is lower than the atmospheric pressure Pt, the gas in the atmosphere flows into the cassette chamber 1 through the fourth gas discharge means, the piping Te, the valve V12 and the piping Td. The internal pressure gradually increases and the pressure indicated by the pressure gauge PG changes, too.

Next, referring to step S76, this condition is maintained for a certain time, until the pressure indicated by the pressure gauge PG is stabilized and the flow rate measuring devices FMa and FMb indicate that no gas is flowing through the check valves Ca and Cb, respectively. When the pressure indicated by the pressure gauge PG is stabilized and the flow rate measuring devices FMa and FMb respectively indicate absence of gas flowing through the check valves Ca and Cb, the atmospheric pressure Pt and the internal pressure are equal. Thus, in steps S72–S76, with the cassette chamber 1 evacuated to make a vacuum with the valve V12 closed, the valve V12 is opened to introduce the purge gas into the cassette chamber 1 and the valve V13 is opened. In step S76, as the flow rate measuring devices FMa and FMb detect absence of flow of gas through the check valves Ca and Cb, it is detected that the internal pressure in the cassette chamber 1 is stabilized.

The operation in step S77 and the movement of the object OBJ from the atmosphere into the cassette chamber 1 are the same as those in the seventh preferred embodiment.

In addition to the effect of the seventh preferred embodiment, this preferred embodiment provides the following effect. That is to say, in addition to confirming that the pressure is stabilized by using the pressure gauge PG, the presence of the flow rate measuring device FMb enables correct confirmation that the atmospheric pressure and the internal pressure are equal.

Modified Examples

Figure 17:
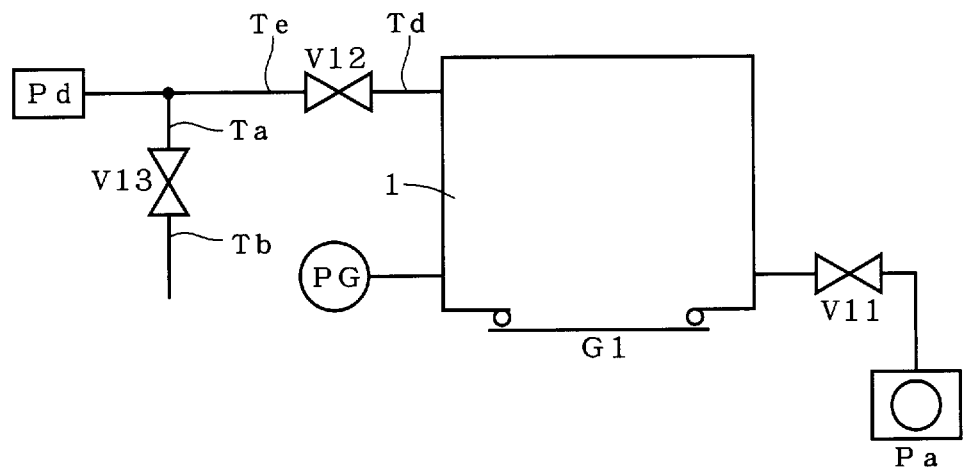
FIG. 17 is a diagram showing an example of modification of the eighth preferred embodiment of the present invention.
Figure 18:
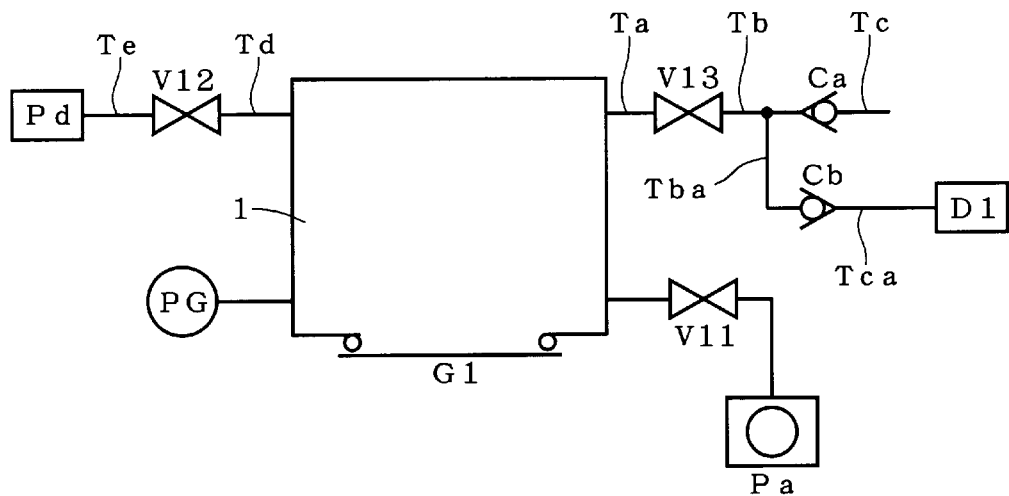
FIG. 18 is a diagram showing an example of modification of the second preferred embodiment of the present invention.
Figure 19:
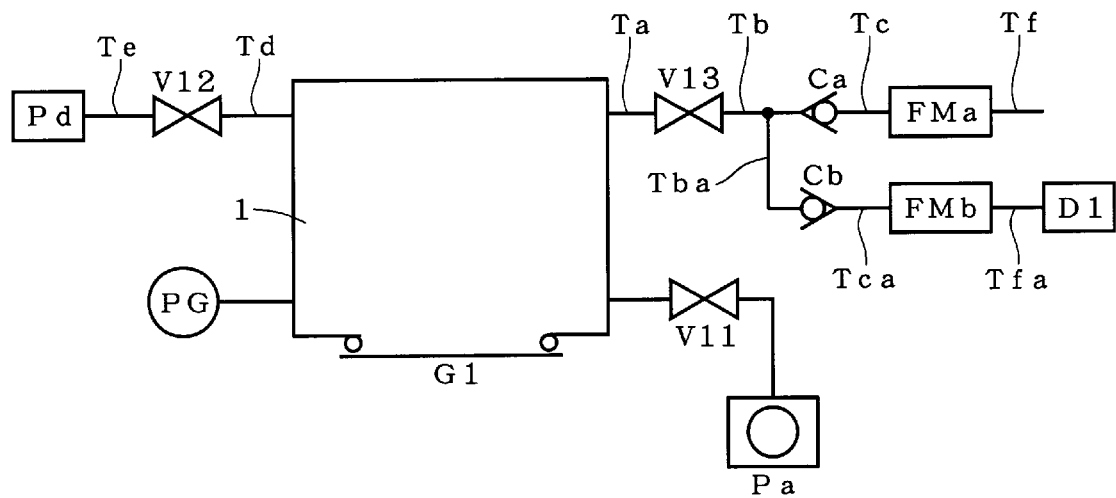
FIG. 19 is a diagram showing an example of modification of the fourth preferred embodiment of the present invention.
Figure 20:
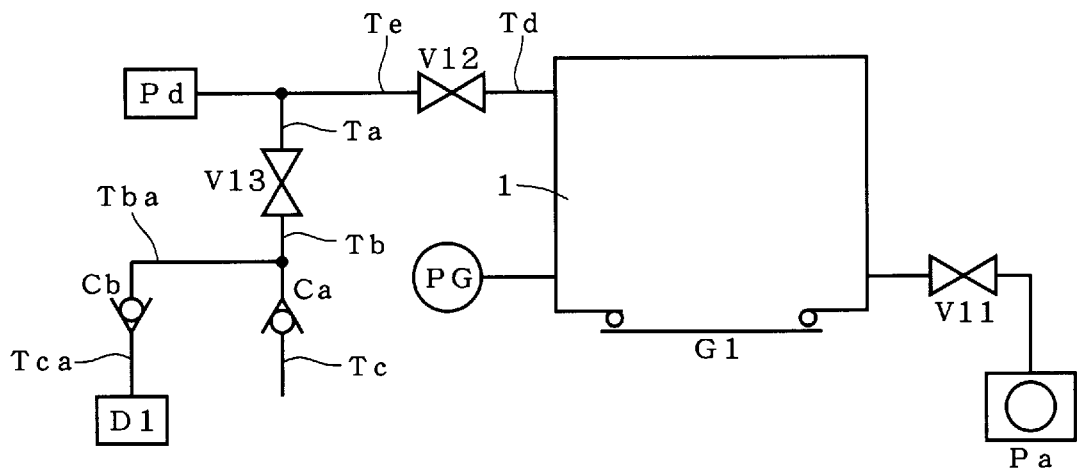
FIG. 20 is a diagram showing an example of modification of the sixth preferred embodiment of the present invention.
Figure 21:
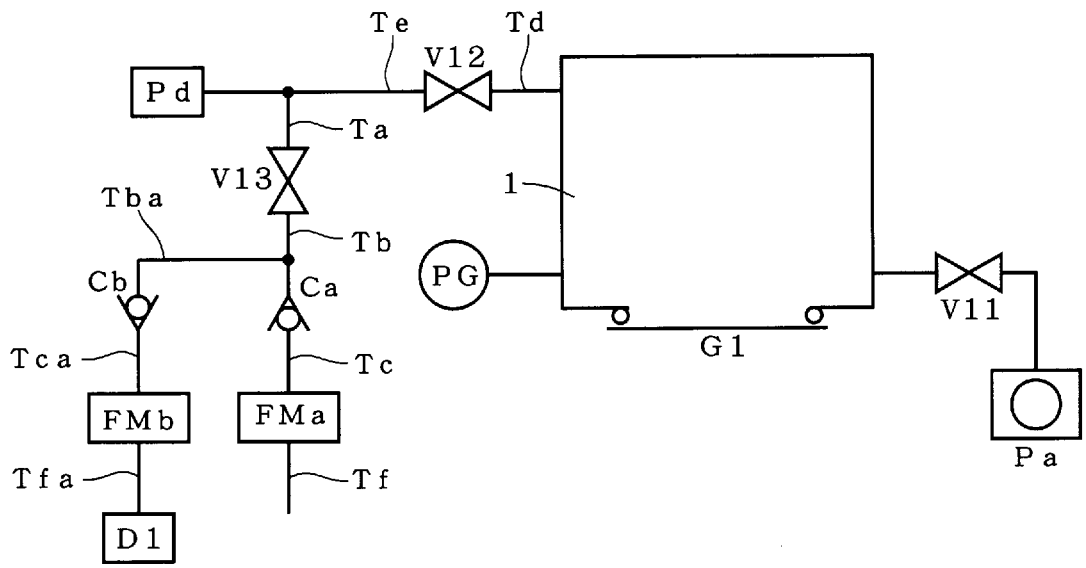
FIG. 21 is a diagram showing an example of modification of the eighth preferred embodiment of the present invention.
Figure 22:
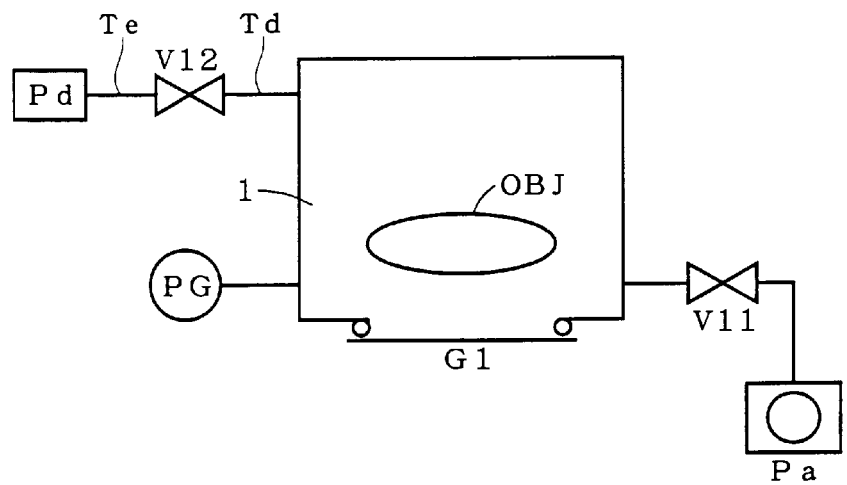
FIG. 22 is a diagram showing a structure of a part of a conventional semiconductor production device.
Figure 23:
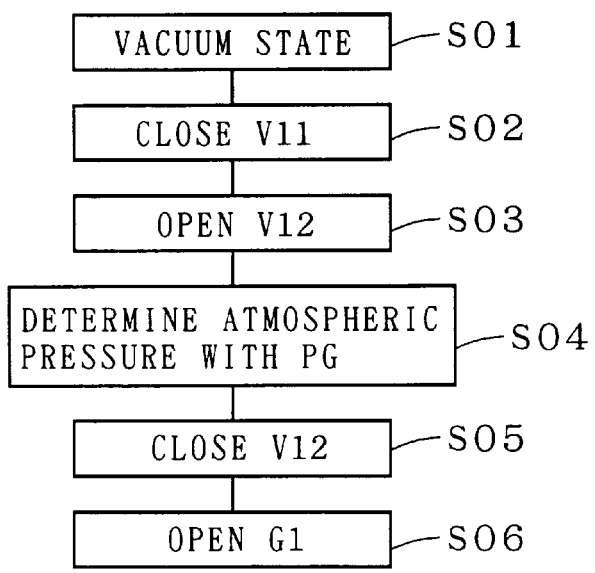
FIG. 23 is a flowchart showing a conventional method for adjusting the internal pressure.
Figure 24:
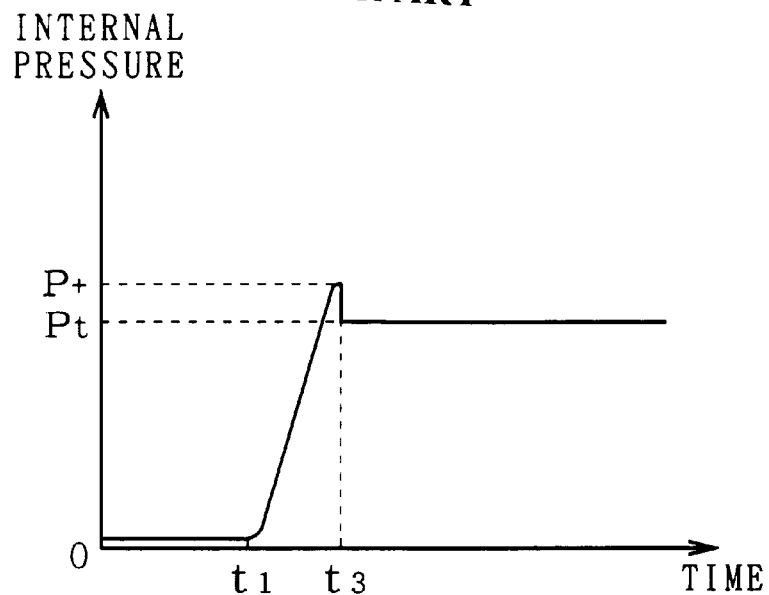
FIG. 24 is a graph showing change of the internal pressure in a conventional case.
Figure 25:
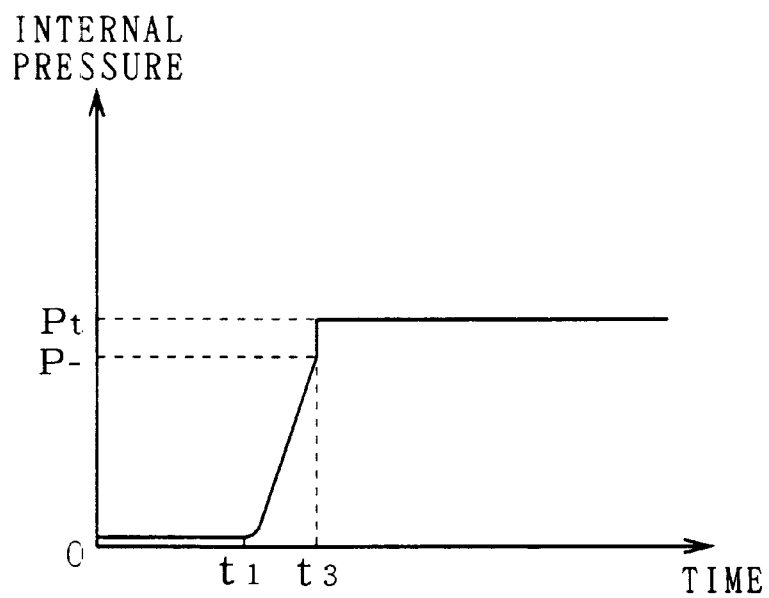
FIG. 25 is a graph showing change of the internal pressure in a conventional case.

FIG. 17 is a diagram showing an example of modification of the eighth preferred embodiment. As shown in FIG. 17, the gas discharge means may be formed only of the piping Ta and Tb and the valve V13. This modification provides the effect of the eighth preferred embodiment with the gas discharge means having a simplified structure.

FIG. 18 to FIG. 21 are diagrams showing modifications of the second, fourth, sixth and eighth preferred embodiments, respectively. As shown in FIG. 18 to FIG. 21, the gas discharge means additionally includes a bag D1 containing a purge gas as the gas which is caused to flow into the cassette chamber 1 from the atmosphere. The bag D1 exists in the atmosphere and is connected to one end of the piping Tca or Tfa. The bag is formed of a material which is easily deformed with the atmospheric pressure, such as polyester. Accordingly, the pressure of the bag D1 and the atmospheric pressure are always equal. In the second, fourth, sixth and eighth preferred embodiments, water vapor in the atmosphere may flow as dust particles into the cassette chamber 1 through the gas discharge means. In this case, the water vapor expands in the cassette chamber 1 to cause dew condensation in the chamber 1. Causing the purge gas in the bag D1 to flow into the cassette chamber 1 through the second gas discharge means or the fourth gas discharge means prevents dust in the atmosphere from flowing into the cassette chamber 1.

In the fifth to eighth preferred embodiments and the modifications of the sixth and eighth preferred embodiments, as compared with the first to fourth preferred embodiments in which the gas introducing/exhausting device 200 and the gas discharge means are independently connected to the cassette chamber 1, it is possible to connect a less number of piping to the inner wall of the cassette chamber 1, which allows dust particles to adhere to the inner wall of the cassette chamber 1 in a smaller area. By applying the second to eighth preferred embodiments and the modified examples, the number of dust particles is reduced, as shown in FIG. 5 described in the first preferred embodiment While the invention has been described in detail, the foregoing description is in all aspects illustrative and not restrictive. It is understood that numerous other modifications and variations can be devised without departing from the scope of the invention.

I claim:

1. A semiconductor production device comprising:

a processing chamber having a gate through which an object of processing is conveyed in and out;

a pressure gauge for measuring internal pressure in said processing chamber;

exhausting means for exhausting said processing chamber to make a vacuum;

purge gas introducing means for introducing a purge gas into said processing chamber;

a valve; and a check valve having its one end connected to said processing chamber through said valve and its other end maintained at atmospheric pressure, for allowing movement of gas only in one direction between said one end and said other end.

2. The semiconductor production device according to claim 1, further comprising another check valve having its one end connected to said processing chamber through said valve and its other end opened to atmosphere, for allowing movement of gas only in the opposite direction to the direction which said check valve allows.

3. The semiconductor production device according to claim 1, wherein said valve is provided in a position branched off from said purge gas introducing means.

4. The semiconductor production device according to claim 1, further comprising flow rate measuring means for measuring a flow rate of gas flowing through said check valve.

5. The semiconductor production device according to claim 4, further comprising, another check valve having its one end connected to said processing chamber through said valve and its other end opened to atmosphere, for allowing movement of gas only in the opposite direction to the direction which said check valve allows, and another flow rate measuring means for measuring a flow rate through said another check valve.

6. The semiconductor production device according to claim 3, further comprising flow rate measuring means for measuring a flow rate of gas flowing through said check valve.

7. The semiconductor production device according to claim 6, further comprising, another check valve having its one end connected to said processing chamber through said valve and its other end opened to atmosphere, for allowing movement of gas only in the opposite direction to the direction which said check valve allows, and another flow rate measuring means for measuring a flow rate through said another check valve.

8. The semiconductor production device according to claim 1, wherein said check valve allows movement of gas only in the direction from said other end to said one end, and said semiconductor production device further comprises a bag connected to said other end, provided in the atmosphere with a certain gas contained therein, and capable of deformation such that pressure of said certain gas and atmospheric pressure become equal.

9. A method of adjusting internal pressure in a semiconductor production device which comprises, a processing chamber into and out of which an object of processing is conveyed, a pressure gauge for measuring internal pressure of said processing chamber, a valve having its one end connected to said processing chamber, and a check valve having its one end connected to the other end of said valve and its other end maintained at atmospheric pressure, for allowing movement of gas only in one direction between said one end and said other end, wherein said internal pressure adjusting method comprises, a first step of introducing a purge gas into said processing chamber evacuated to a vacuum with said valve closed, until said pressure gauge detects that the internal pressure of said processing chamber is at atmospheric pressure, a second step of opening said valve to move gas on the basis of a pressure difference between the two ends of said check valve, and a third step of detecting stabilization of said internal pressure.

10. The method of adjusting internal pressure in the semiconductor production device according to claim 9, wherein said semiconductor production device further comprises exhausting means for exhausting said processing chamber to a vacuum and purge gas introducing means for introducing the purge gas into said processing chamber.

11. The semiconductor production device according to claim 10, wherein said valve is provided in a position branched off from said purge gas introducing means.

12. A method of adjusting internal pressure in a semiconductor production device which comprises, a processing chamber into and out of which an object of processing is conveyed, purge gas supply means for supplying a purge gas, a first valve having its one end connected to said processing chamber and its other end connected to said purge gas supply means, a second valve having its one end connected to said other end of said first valve and its other end, and a check valve having its one end connected to said other end of said second valve and its other end maintained at atmospheric pressure, for permitting movement of gas only in one direction between said one end and said other end, wherein said internal pressure adjusting method comprises, a first step of, with said processing chamber evacuated to make a vacuum with said first valve closed, opening said first valve to introduce said purge gas into said processing chamber, a second step of opening said second valve, and a third step of conveying said object of processing in and out after the internal pressure of said processing chamber is stabilized.

13. The method of adjusting internal pressure in the semiconductor production device according to claim 12, wherein said first and second steps are conducted at the same time, and in said third step, before conveying said object of processing in and out after the internal pressure of said processing chamber is stabilized, said first and second valves are closed in this order.

14. The method of adjusting internal pressure of the semiconductor production device according to claim 12, wherein said semiconductor production device further comprises flow rate measuring means for measuring a flow rate of gas flowing through said check valve, and in said third step, stabilization of said internal pressure is detected as said flow rate measuring means detects absence of gas flowing through said check valve.

15. The method of adjusting internal pressure in the semiconductor production device according to claim 14, wherein said semiconductor production device further comprises a pressure gauge for measuring internal pressure of said processing chamber, and said internal pressure adjusting method further comprises a fourth step conducted when the operation moves from said first step to said second step, for confirming that said internal pressure is at atmospheric pressure by using said pressure gauge.

16. A method of processing an object of processing, using a semiconductor production device, said semiconductor production device comprising:

a processing chamber having a gate through which said object of processing is conveyed in and out;

a pressure gauge for measuring internal pressure in said processing chamber;

exhausting means for exhausting said processing chamber to make a vacuum;

purge gas introducing means for introducing a purge gas into said processing chamber;

a valve; and a check valve having its one end connected to said processing chamber through said valve and its other end maintained at atmospheric pressure, for allowing movement of gas only in one direction between said one end and said other end, said method comprising:

a first step of introducing said purge gas into said processing chamber evacuated to a vacuum with said valve closed, until said pressure gauge detects that the internal pressure of said processing chamber is at atmospheric pressure;

a second step of opening said valve to move gas on the basis of a pressure difference between the two ends of said check valve; and a third step of detecting stabilization of said internal pressure.

* * * * *